J. W. WOODARD.
CLIP FOR CONNECTING TEMPLES AND NOSE PIECES TO LENSES.
APPLICATION FILED MAR. 18, 1909.
937,732.
Patented Oct. 19, 1909.
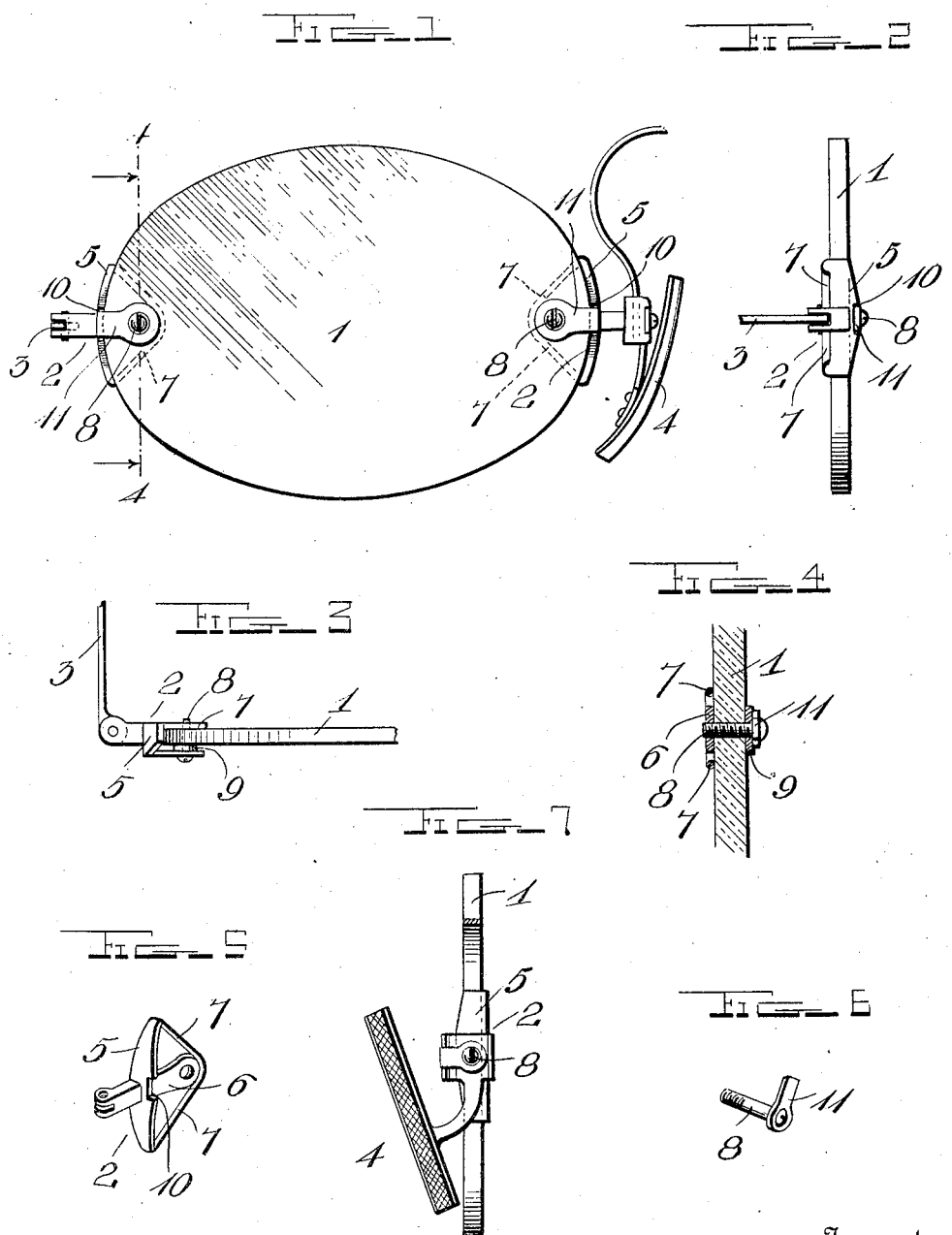
Witnesses
Inventor
Joseph W. Woodard
by H. B. Wilson & Co.
Attorneys

UNITED STATES PATENT OFFICE.

JOSEPH WILLIAM WOODARD, OF WASHINGTON, DISTRICT OF COLUMBIA.

CLIP FOR CONNECTING TEMPLES AND NOSE-PIECES TO LENSES.

937,732.

Specification of Letters Patent. Patented Oct. 19, 1909.

Application filed March 18, 1909. Serial No. 484,144.

*To all whom it may concern:*

Be it known that I, JOSEPH WILLIAM WOODARD, a citizen of the United States, residing at Washington, in the District of Columbia, have invented certain new and useful Improvements in Clips for Connecting Temples and Nose-Pieces to Lenses; and I do declare the following to be a full, clear, and exact description of the invention, such as will enable others skilled in the art to which it appertains to make and use the same.

This invention relates to clips for connecting temples and nose pieces to the lenses of rimless spectacles or eye glasses and the principal object of the invention is to provide a clip of this character having a greater clamping surface than the ones now commonly used for the same purpose, so that the clip may be caused to so securely embrace or clamp the lens that all possibility of its working loose will be entirely obviated.

With this and other objects in view, the invention consists of certain novel features of construction, combination and arrangements of parts, as will be more fully described and particularly pointed out in the appended claim.

In the accompanying drawings, Figure 1 is a front elevation of the lens with a temple and nose piece connected thereto by means of my improved clips. Fig. 2, is an outside end view of Fig. 1; Fig. 3, is a plan view of the outer portion of the lens and the outer clip shown in Fig. 1; Fig. 4, is a vertical transverse section taken on line 4—4, of Fig. 1, looking in the direction indicated by the arrows. Fig. 5, is a detail perspective view on an enlarged scale of one of the clips; Fig. 6, is a detail perspective view on an enlarged scale of one of the locking arms and its fastening screw; and, Fig. 7, is an inside end view of Fig. 1.

In the embodiment illustrated the numeral 1 indicates a spectacle lens and 2, the clips or fitting for connecting the temple 3, and the nose piece 4, thereto. These clips are of identical construction and each comprises the usual body portion or plate 5, shaped to fit and engage the edge of the lens, and a clamping member in the form of a strip 6, which engages the inner face thereof. To add greater strength to the clip and a more extended bearing surface, a V-shaped clamping wire, 7, is connected at opposite ends to the plate, 5, of the clip at one edge of said plate and at its center or apex to the clamping member, 6. A fastening screw, 8, passes through the lens and screws through the clamping member 6. A clamping washer, 9, provided with a central aperture to receive the screw, 8, is arranged on one face of the lens between it and the head of the screw 8 and is clamped against the same when the fastening screw is screwed into position.

The front edge of the plate 5 is provided with a central recess 10, to receive the free end of a resilient locking arm, 11, rigidly connected to the headed end of the fastening screw in order to hold or lock the fastening screw against working loose when completely screwed up into position and to form one jaw of the clip whereby the lens is securely held between it and the members 6 and 7.

From the foregoing it will be seen that owing to the extended bearing surface of the clip it will securely clamp the lens when secured in position and because of its construction cannot work loose to the slightest degree or extent until removed by the operator.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

I claim as my invention:—

A fitting for rimless spectacles or eye glasses comprising a plate shaped to fit the edge of a lens and having a V-shaped member secured at its opposite ends to the opposite ends of said plate at one edge thereof and extending in a plane at right angles to said plate, a strip secured at one end to the edge of said plate to which said wire is connected at a point midway the ends of the plate, the other end of said strip being apertured and secured to the apex of said V-shaped member, said plate having a recess in its other edge at a point opposite said strip, a screw adapted to extend through a lens and the aperture in said strip and having a laterally extending resilient arm fixed to the headed end thereof, the free end of said arm being adapted to engage the recess in said plate when the device is applied and forming a detachable clamping jaw and screw lock.

In testimony whereof I have hereunto set my hand in presence of two subscribing witnesses.

JOSEPH WILLIAM WOODARD.

Witnesses:
J. P. DUFFIE,
C. MUNTSEL.